United States Patent
Fujiu

(10) Patent No.: US 9,341,202 B2
(45) Date of Patent: May 17, 2016

(54) SUPPORT DEVICE

(71) Applicant: NIFCO INC., Yokohama-shi, Kanagawa (JP)

(72) Inventor: Tatsurou Fujiu, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/455,420

(22) Filed: Aug. 8, 2014

(65) Prior Publication Data
US 2015/0090851 A1    Apr. 2, 2015

(30) Foreign Application Priority Data
Oct. 1, 2013   (JP) .................. 2013-206121

(51) Int. Cl.
| | |
|---|---|
| A47B 23/00 | (2006.01) |
| F16B 2/10 | (2006.01) |
| F16B 2/16 | (2006.01) |
| B60R 11/02 | (2006.01) |
| G06F 1/16 | (2006.01) |
| B42F 9/00 | (2006.01) |
| B60R 11/00 | (2006.01) |
| F16B 21/08 | (2006.01) |

(52) U.S. Cl.
CPC . *F16B 2/10* (2013.01); *B60R 11/02* (2013.01); *F16B 2/16* (2013.01); *G06F 1/16* (2013.01); *A47B 23/002* (2013.01); *B42F 9/001* (2013.01); *B60R 2011/0071* (2013.01); *F16B 21/086* (2013.01)

(58) Field of Classification Search
USPC ............... 248/441.1, 451, 452, 453, 226.11, 248/227.4, 231.81, 230.7, 228.81, 228.7, 248/316.1, 316.7; 24/67 R, 67.3, 67.5, 24/67.11, 326, 327, 329, 331, 332, 334, 24/335, 336, 338, 455, 489, 499, 509; 281/49
See application file for complete search history.

(56) References Cited

U.S. PATENT DOCUMENTS

| | | | | |
|---|---|---|---|---|
| 2,615,279 | A * | 10/1952 | Haley, Jr. | 248/441.1 |
| 2,642,841 | A * | 6/1953 | Funk | 40/354 |
| 4,586,730 | A * | 5/1986 | Shulyak | 281/45 |
| 5,823,500 | A * | 10/1998 | La Coste | 248/444 |
| 7,614,598 | B2 * | 11/2009 | Smith | 248/452 |
| 2012/0006870 | A1 * | 1/2012 | Proctor et al. | 224/275 |
| 2012/0091308 | A1 * | 4/2012 | Small et al. | 248/452 |

FOREIGN PATENT DOCUMENTS

JP    S61-125080 U   8/1986

* cited by examiner

*Primary Examiner* — Alfred J Wujciak
(74) *Attorney, Agent, or Firm* — Manabu Kanesaka

(57) ABSTRACT

A support device for detachably supporting a portable electronic apparatus includes a base body, a support column member standing from one end of the base body, a flap axially supported in the support column member turnably clamp the portable electronic apparatus between the flap and the support face, conical rollers attached to the flap, each conical roller having an outer periphery diameter enlarged from one end portion thereof, and an urging device provided between the support column member and the flap and urging the flap in a direction of approaching the base body. The flap includes an arm portion, and support shafts extending in a right-and-left width direction from a tip of the arm portion. The support shafts incline relative to the base body, and each conical roller is turnably supported on the support shaft such that a small diameter portion is located close to the arm portion.

4 Claims, 7 Drawing Sheets

SUPPORT DEVICE

BACKGROUND OF THE INVENTION AND RELATED ART STATEMENT

The present invention relates to a support device which can reliably hold and fix a portable electronic apparatus in a small space.

For example, as for a conventional support device for an in-car electronic apparatus, there is presented one with a type of sandwiching and holding an electronic apparatus between lateral rollers disposed approximately in parallel at a predetermined interval.

In a support device for electronic apparatus described in Japanese Utility Model Application Publication No. S61-125080, there is disposed a plurality of rollers supported through springs inside right-and-left long holes in a width direction of a support column body to be movable backward, and the support device for electronic apparatus holds and fixes the portable electronic apparatus by inserting the portable electronic apparatus between the rollers.

Also, as for another conventional example, there is presented a support device for electronic apparatus with a type of holding the electronic apparatus from above by a single-shaft Japanese-hand-drum-type roller whose center diameter is reduced.

However, in the conventional support device, there is a defect that a lateral width becomes large compared to a width of the electronic apparatus.

Also, even when the electronic apparatus is set, the electronic apparatus has to be precisely inserted between the rollers so as to have poor operability.

Furthermore, in the type of holding the electronic apparatus by the Japanese-hand-drum-type roller from above, in order to avoid a situation that the rollers abut against a liquid crystal face of the electronic apparatus, a shape of the Japanese-hand-drum-type roller becomes large so as to have a problem of producing an unnecessary dead space at a roller upper portion. Also, when the electronic apparatus is inserted, since there is no centering function, the electronic apparatus has to be set at a proper position so as to have poor operability.

The present invention is made in order to solve the aforementioned inconveniences, and provides a support device formed in such a way as to clamp the portable electronic apparatus by a support column member provided at one end of a base body including a support face; and a flap axially supported in the support column member half-turnably. Also, the support device includes an urging device urging the flap in a direction of approaching the support face, and a support shaft is formed in the flap in a right-and-left width direction from a tip of an arm portion extended at a center in a width direction of the base body. The support shaft inclines relative to the support face, and there is turnably supported a conical roller whose outer periphery diameter is expanded as being separated from the arm portion. Thereby, the conical roller can hold an upper end of the electronic apparatus in a width direction so as to save a space and automatically center the electronic apparatus.

Further objects and advantages of the invention will be apparent from the following description of the invention.

SUMMARY OF THE INVENTION

The present invention has the following contents.

(1) A support device detachably supporting a portable electronic apparatus comprises a base body having approximately a flat plate shape including a support face; a support column member provided to stand from one end of the base body; a flap axially supported in the support column member half-turnably, and clamping the portable electronic apparatus between the flap and the support face; and an urging device provided between the support column member and the flap, and urging the flap in a direction of approaching the support face. In the flap, there is formed support shafts in a right-and-left width direction from a tip of an arm portion provided at a center in a width direction of the base body. The support shafts incline relative to the support face, and a conical roller, whose outer periphery diameter is enlarged as being spaced from the arm portion, is turnably supported on the support shaft.

(2) In the support device described in (1), a turning shaft line of the conical roller inclines toward an insertion direction of the portable electronic apparatus.

(3) In the support device described in (1) or (2), the support column member is provided on a back end side relative to the insertion direction of the portable electronic apparatus.

(4) In the support device described in (1) to (3), a surface of the conical roller is formed by an elastic member.

(5) In the support device described in (1) to (4), the support shafts are formed by inclining downward from an apex of the arm portion toward right-and-left end portions, respectively.

According to the present invention, the support device detachably supporting the portable electronic apparatus comprises the base body having approximately the flat plate shape including the support face; the support column member provided to stand from one end of the base body; the flap axially supported in the support column member half-turnably, and clamping the portable electronic apparatus between the flap and the support face; and the urging device provided between the support column member and the flap, and urging the flap in the direction of approaching the support face. In the flap, there is formed the support shafts in the right-and-left width direction from the tip of the arm portion extended at the center in the width direction of the base body. The support shafts incline relative to the support face, and the conical rollers, whose outer periphery diameter is enlarged as being spaced from the arm portion, are turnably supported on the support shafts so as to save the space of the support device itself. Also, when the portable electronic device is inserted, the conical rollers can carry out the centering of the electronic apparatus at a proper position. Also, since the conical rollers rotate, the flap rises by an inserted force, and the electronic apparatus can be inserted with a minimal resistance.

Also, the turning shaft line of the conical roller inclines toward the insertion direction of the portable electronic apparatus so as to save the space of the support device itself. Also, when the electronic apparatus is inserted, the conical rollers carry out the centering of the electronic apparatus at the proper position. Also, the turning shaft lines of the conical rollers incline in the insertion direction so as to stabilize an insertion action.

Also, the support column member is provided on the back end side relative to the insertion direction of the portable electronic apparatus so as to assure a space at hand, and prevent hindering of the handling.

Also, the surface of the conical roller is formed by the elastic member so as not to damage a liquid crystal face of the electronic apparatus.

Also, the support shafts are formed by inclining downward from the apex of the arm portion toward right-and-left end portions, respectively, so that the conical rollers do not protrude in an upper direction of the device so as to save the space in a height direction. Also, a size in a width direction of the support device can be shortened as well.

DETAILED DESCRIPTION OF PREFERRED EMBODIMENTS

The present invention comprises a base body having approximately a flat plate shape including a support face; a support column member provided to stand from one end of the base body; a flap axially supported in the support column member half-turnably, and clamping a portable electronic apparatus between the flap and the aforementioned support face; and an urging device provided between the support column member and the flap, and urging the flap in a direction of approaching the support face. In the flap, there are formed support shafts in a right-and-left width direction from a tip of an arm portion extended at a center in a width direction of the base body. The support shaft inclines relative to the support face, and a conical roller, whose outer periphery diameter is enlarged as being located away from the arm portion, is turnably supported on the support shaft so as to save a space of a support device itself. Also, when the portable electronic apparatus is inserted, the conical rollers can carry out a centering of the electronic apparatus at a proper position.

First Embodiment

Figure 1:
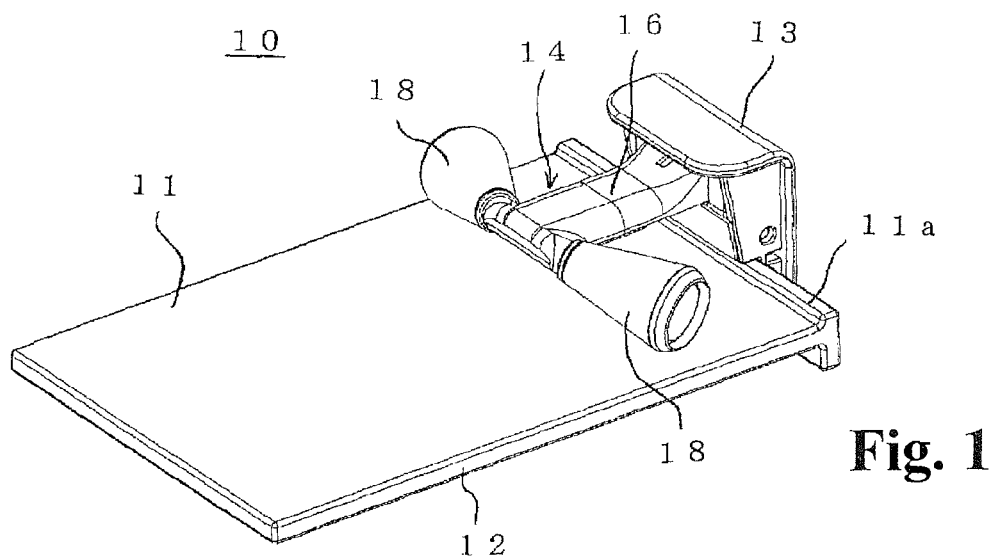
FIG. 1 is a perspective view of a support device which is the first embodiment of the present invention.
Figure 2:
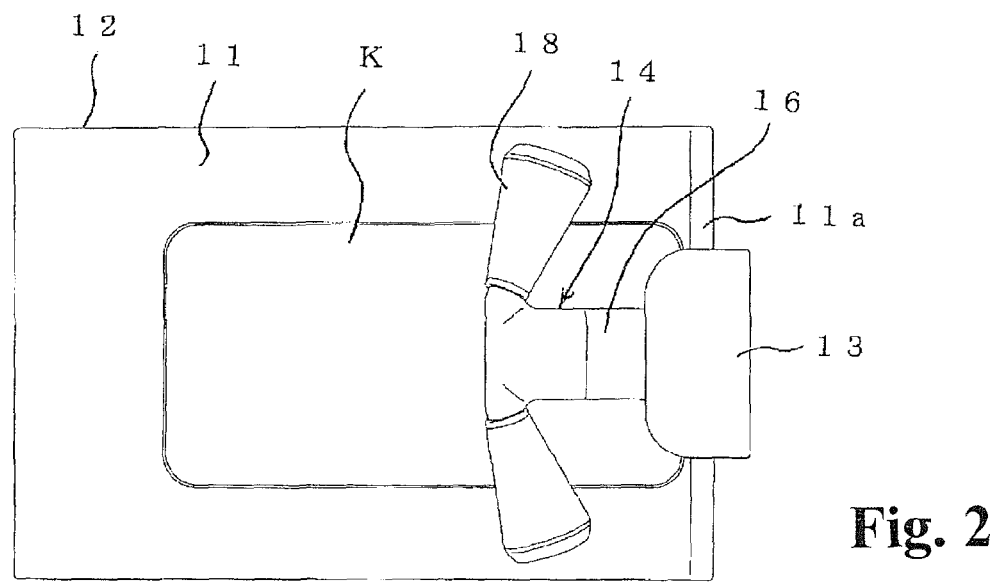
FIG. 2 is a plan view showing a state wherein a portable electronic apparatus is held in the support device.
Figure 3:
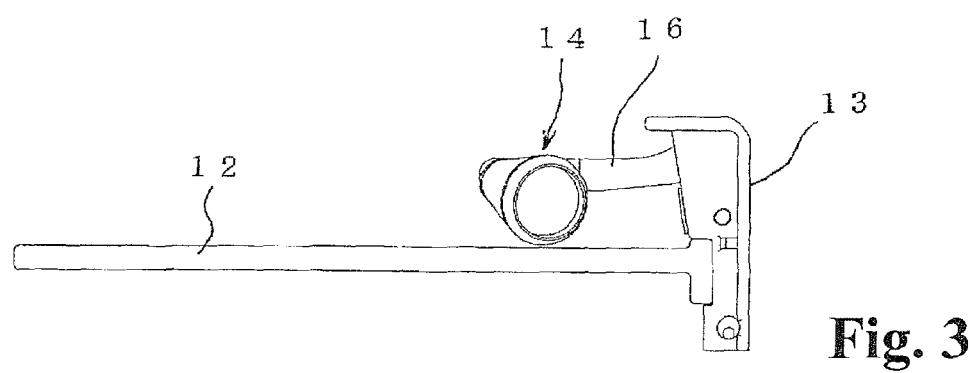
FIG. 3 is a side view of the support device of the present invention.
Figure 4:
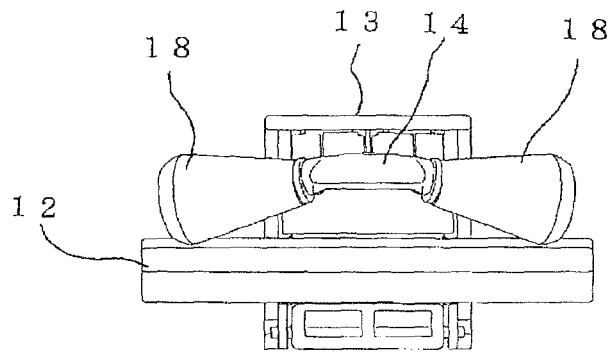
FIG. 4 is a front view of the support device.
Figure 5:
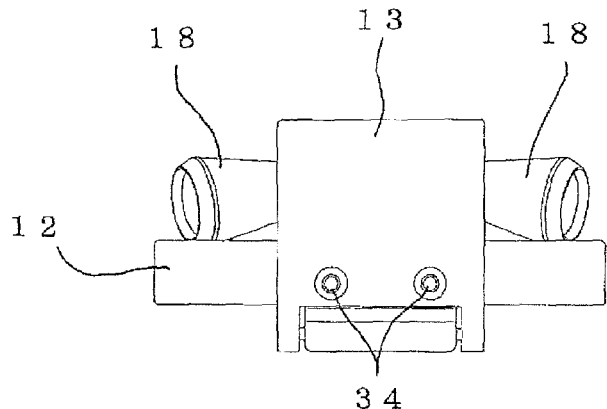
FIG. 5 is a back view of the support device.

Hereinafter, the present invention will be explained in detail with reference to the drawings showing an embodiment. FIG. 1 is a perspective view of a support device which is the first embodiment of the present invention; FIG. 2 is a plan view showing a state wherein the portable electronic apparatus is held in the support device of the present invention; FIG. 3 is a side view of the support device; FIG. 4 is a front view of the support device of the present invention; and FIG. 5 is a back view of the support device of the present invention. Here, a support device 10 of the present invention detachably supports a portable electronic apparatus K, and comprises a base body 12 having approximately a flat plate shape including a support face 11; a support column member 13 provided to stand from one end of the base body 12; a flap 14 axially supported in the support column member 13 half-turnably, and clamping the portable electronic apparatus K between the flap 14 and the support face 11; and an urging device 15 provided between the support column member 13 and the flap 14, and urging the flap 14 in the direction of approaching the support face 11. Also, in the flap 14, there are formed support shafts 17 in the right-and-left width direction from a tip of an arm portion 16 extending at the center in the width direction of the base body 12. The support shaft 17 inclines relative to the support face 11, and also inclines toward an insertion direction of the portable electronic apparatus. Also, a conical roller 18, whose outer periphery diameter is enlarged as being spaced from the arm portion 16, is turnably supported on the support shaft 17.

The base body 12 includes the flat support face 11 on an upper face, and is provided with a flange portion lie at a back end. Also, the support face 11 is formed by a synthetic resin and the like having a moderate friction coefficient in order to allow the portable electronic apparatus K to be easily moved and held.

Figure 8:
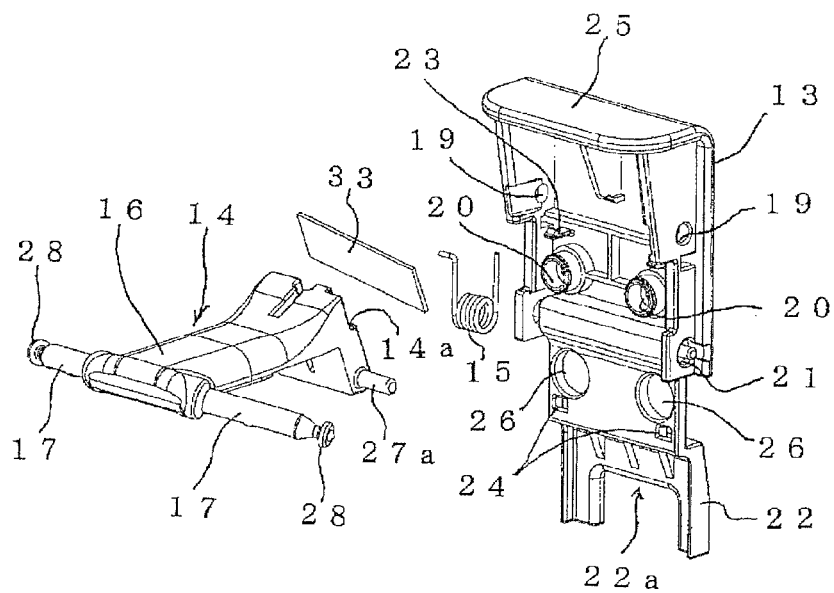
FIG. 8 is an exploded perspective view showing the flap and a cover member without the conical roller.
Figure 9:
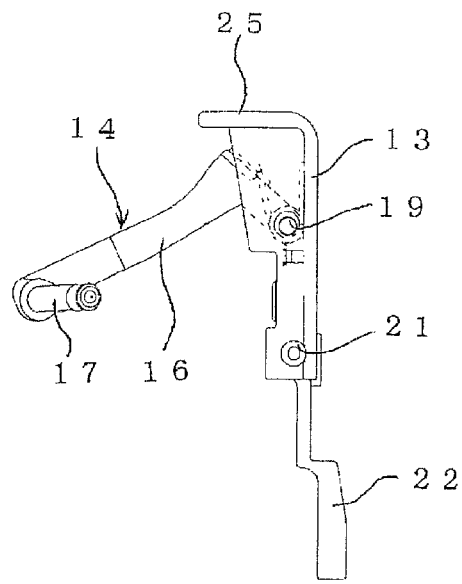
FIG. 9 is a side view showing the flap and the cover member without the conical roller.
Figure 10:
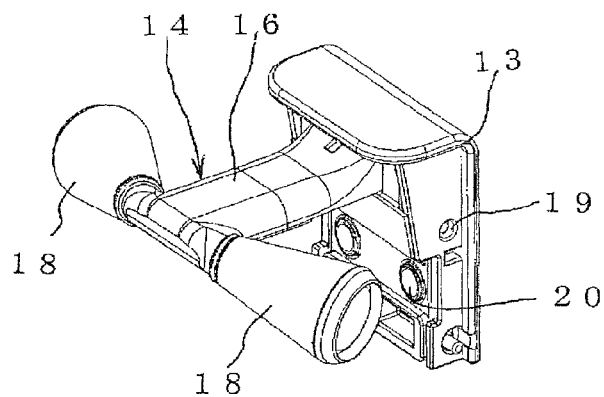
FIG. 10 is a perspective view showing the flap and the cover member.
Figure 11:
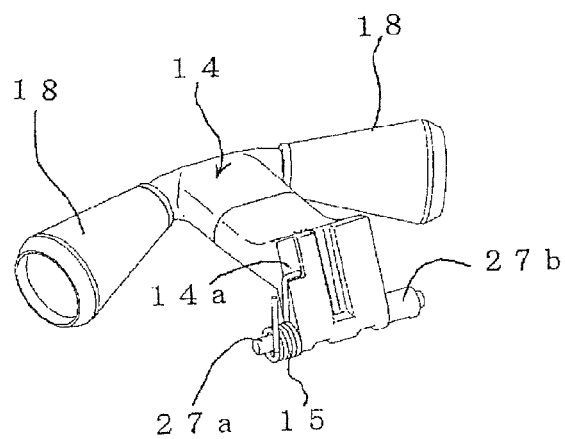
FIG. 11 is a back perspective view showing the flap and the cover member.
Figure 12:
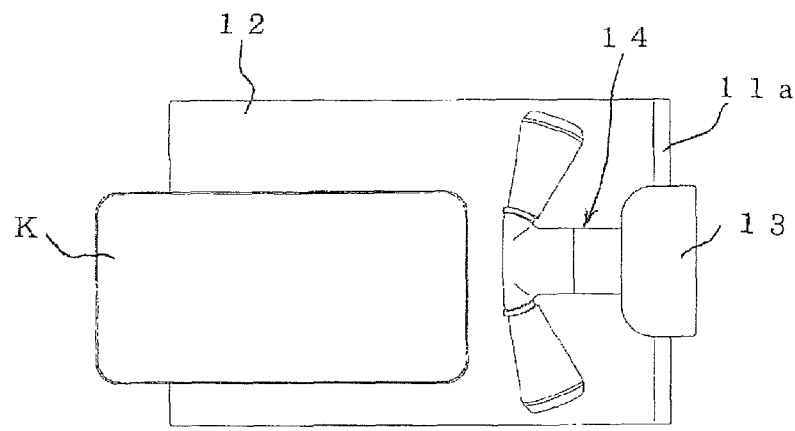
FIG. 12 is an explanatory drawing showing a case wherein an electronic apparatus is inserted into the support device of the present invention.

As shown in FIG. 8 to FIG. 10, the support column member 13 includes a pair of shaft holes 19 for axially supporting the flap 14 at a predetermined interval, and screw holes 20 for fixing the flap 14 to the base body 12. Also, in shaft holes 21, there is axially supported a cover 22 which covers one portion of a front face of the support column member 13 turnably. In the cover 22, there is formed a notch 22a into which the flap 14 is inserted to pass through at an upper end, and there are formed holes 26 at positions corresponding to the screw holes 20. Furthermore, in the support column member 13, there are formed lock claws 23 for locking the cover 22, and in the cover 22, there are formed claw receiving holes 24. Also, at a top portion of the support column member 13, there is formed a flat top plate portion 25.

As shown in FIG. 6 to FIG. 11, in the flap 14, there are formed the support shafts 17 in the right-and-left width direction from the tip of the arm portion 16 extending at the center in the width direction. Also, at a base end of the arm portion 16, there are provided shafts 27a and 27b for being axially supported in the support pillar member 13. The arm portion 16 bends downward at a base end portion, and at a portion facing the support pillar member 13, there is formed an engagement step portion 14a with which one end of the urging device engages. Also, the support shaft 17 inclines in such a way that a tip approaches the support face 11, and the conical roller 18, whose outer periphery diameter is enlarged as being spaced from the arm portion 16, is turnably supported on the support shaft 17. Namely, the support shafts 17 are formed to incline downward from an apex of the arm portion 16 toward right-and-left end portions, respectively. Furthermore, at the tip of the support shaft 17, there is formed an annular locking flange 28 turnably supporting and retaining the conical roller 18.

Also, the support shaft 17 inclines (retreats) toward the insertion direction of the portable electronic apparatus.

Figure 6:
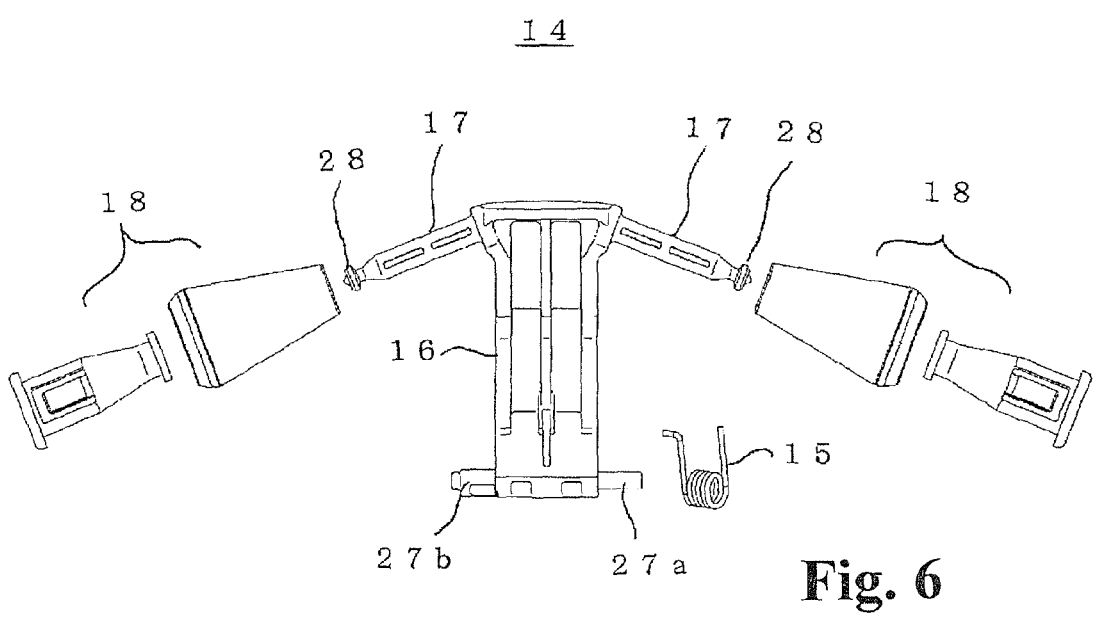
FIG. 6 is an exploded view of a flap forming the support device.
Figure 7:
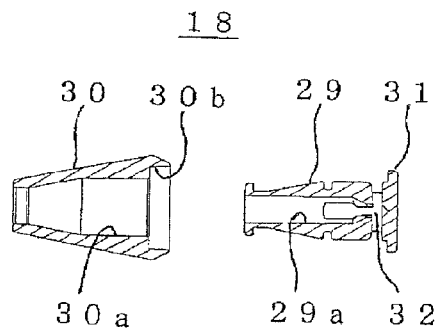
FIG. 7 is an exploded cross-sectional view of a conical roller used for the flap.

As shown in FIGS. 6 to 7, the conical roller 18 is formed by a roller portion 29 axially supported in the support shaft 17 turnably, and a truncated conical elastic roller 30 fitted in the roller portion 29. The roller portion 29 includes a shaft hole 29a for being axially supported in the support shaft 17 at a shaft core portion, and is provided with a detachment-preventing flange 31 at a tip. Also, just in front of the flange 31, there is provided a void 32 to which the locking flange 28 of the support shaft 17 is loosely fitted and which is communicated with the shaft hole 29a.

The elastic roller 30 is formed by a soft material having elasticity such as synthetic rubber, synthetic resin, and the like, and has a truncated conical shape whose outside diameter is large. Also, the elastic roller 30 includes a shaft hole 30a for being fitted to the roller portion 29 at a shaft core, and includes a step portion 30b to which the flange 31 is fitted at an outside end.

Next, assembling procedures of the support device 10 will be explained. First, as shown in FIG. 6, the conical roller 18 formed by the roller portion 29 and the elastic roller 30 is attached to the support shaft 17 of the flap 14. Also, as shown in FIGS. 8 and 9, the flap 14 is turnably attached to the shaft holes 19 of the support column member 13 by the shafts 27a and 27b in a state wherein the cover 22 is open. Moreover, in the shaft 27a, there is disposed the coil spring 15 which is the urging device, and urges the flap 14 in a base body 12 direction. Also, between the support column member 13 and the flap 14, there is disposed an elastic material such as a sponge and the like which is a buffer member 33. When the flap 14 turns around the shaft 27 and is raised, the buffer member 33 cushions an impact in a case of abutting against an inner side of the support column member 13. After the flap 14 is attached, when the cover 22 is closed, the support device 10 becomes a state shown in FIG. 10, and is fixed to the flange portion 11a which is located at the back end of the base body 12 relative to the insertion direction of the portable electronic apparatus through the screw holes 20 and screws 34. The lock claws 23 engage the claw receiving holes 24, so that the cover 22 can maintain a closed state.

Figure 13:
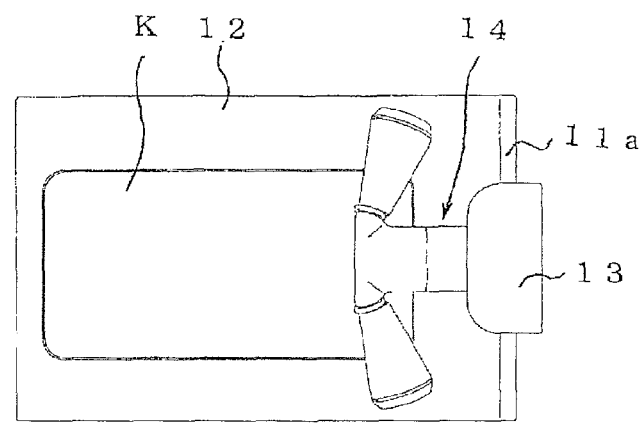
FIG. 13 is an explanatory drawing showing the case wherein the electronic apparatus is inserted into the support device.
Figure 14:
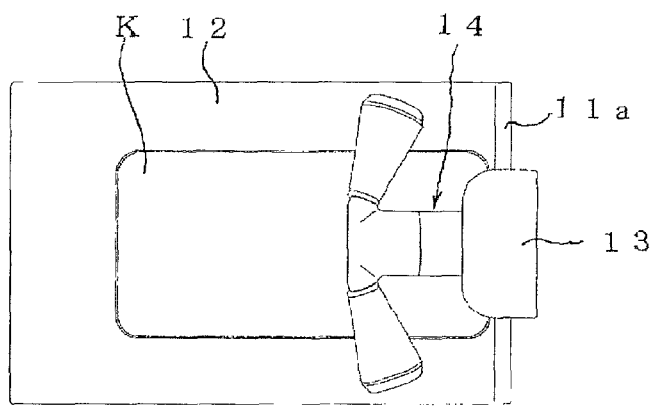
FIG. 14 is an explanatory drawing showing the case wherein the electronic apparatus is inserted into the support device.
Figure 15:
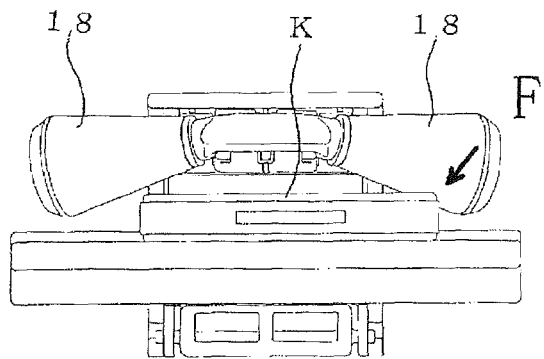
FIG. 15 is a front view in the case wherein the electronic apparatus is inserted into the support device.
Figure 16:
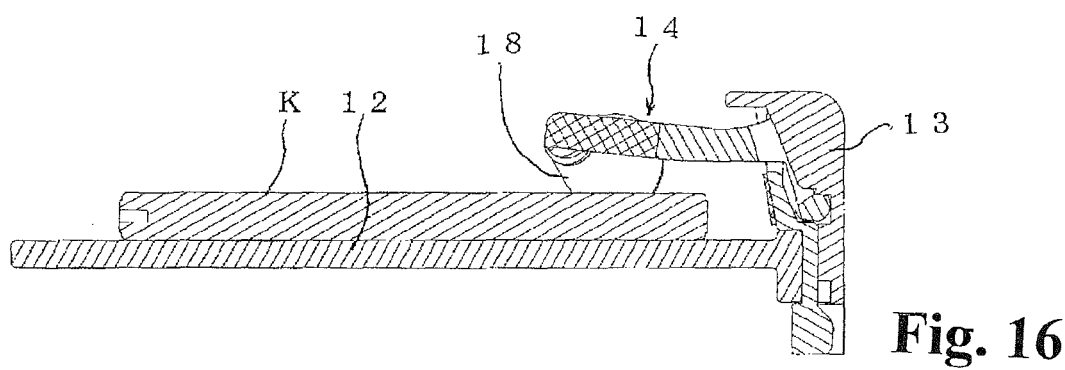
FIG. 16 is a vertical cross-sectional view in a case wherein the electronic apparatus has been inserted into the support device.

Next, a case wherein the portable electronic apparatus K is inserted into the support device 10 formed as mentioned above will be explained according to FIG. 12 to FIG. 16. First, after the portable electronic apparatus K is placed on the support device 10, the portable electronic apparatus K is moved in a flap 14 direction. As shown in FIG. 13, when a tip of the portable electronic apparatus is reached between a pair of conical rollers 18, the flap 14 slightly rises against the urging device 15. At that time, the conical rollers 18 freely rotate, so that the portable electronic apparatus K can be inserted with a minimal force. Also, in a case wherein the portable electronic apparatus is shifted from a center of the flap 14, as shown in FIG. 15, at one side in the width direction, there is produced a gap between the portable electronic apparatus and the conical roller 18. Also, the other side in the width direction receives a reactive force F from the conical roller 18, so that a position of the electronic apparatus is corrected. The electronic apparatus receives a larger force as being shifted from the center in a lateral direction. The portable electronic apparatus is adjusted to a position where a force receiving from the right-and-left conical rollers 18 is equal so as to be centered. The centered electronic apparatus K is inserted until the electronic apparatus K abuts against the flange portion 11a sc as to be held in the support device 10. Thus, the conical rollers 18 of the flap 14 abut against only an upper end of the portable electronic apparatus K, and do not contact a liquid crystal face so as not to damage the liquid crystal face.

Figure 17:
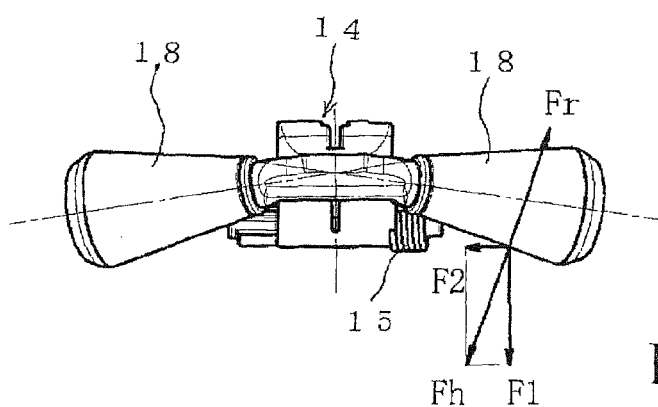
FIG. 17 is an explanatory drawing showing a direction of force acting on the flap (the conical roller) of the present invention.

FIG. 17 explains a direction of a force the conical roller 18 receives from the portable electronic apparatus K and a direction of a force the portable electronic apparatus K receives from the conical roller 18. FIG. 17 explains a case wherein the portable electronic apparatus K abuts against a lower end of the conical roller 18 in order to facilitate understanding. First, when the portable electronic apparatus is inserted, a reactive force Fr vertically acts on an abutment point between the portable electronic apparatus and the conical roller 18. Also, the reactive force Fr depends on a shape of the conical roller and an inclination of the support shaft 17. Moreover, the portable electronic apparatus K receives a reactive force Fh which is equal to the reactive force from the conical roller 18. The reactive force Fh can be divided into F1 and F2. The reactive force F2 performs a centering action of moving the portable electronic apparatus in a center direction. The reactive force F1 allows the conical roller 18 to press the portable electronic apparatus from above so as to hold the portable electronic apparatus on the support face 11, and even if the portable electronic apparatus receives vibration, the portable electronic apparatus can be stably held.

Figure 18:
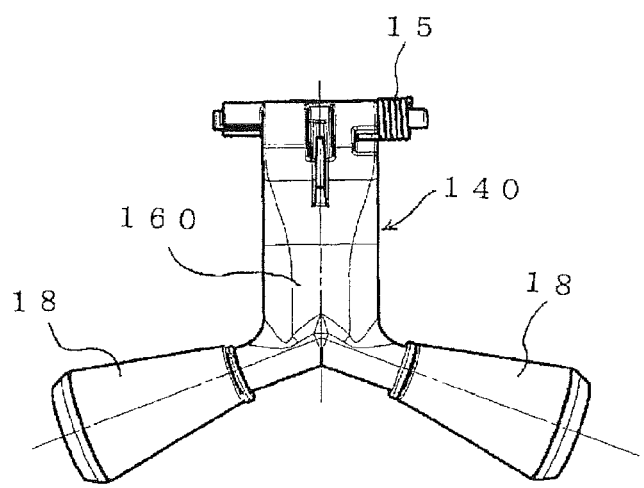
FIG. 18 is a plan view showing a shape of the flap in another embodiment of the present invention.
Figure 19:
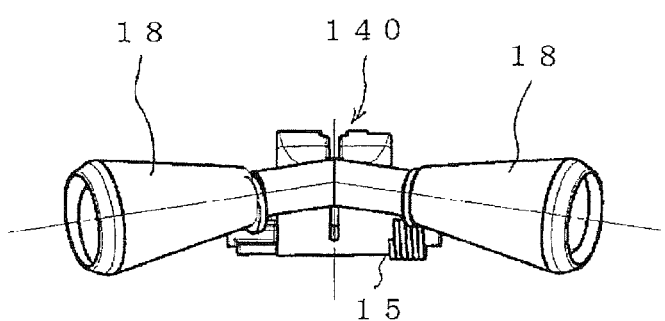
FIG. 19 is a front view showing the shape of the flap.

FIG. 18 is a plan view showing a shape of the flap in another embodiment of the present invention; and FIG. 19 is a front view showing the shape of the flap. In the present embodiment, support shafts which are not shown in the figures and which are formed in a right-and-left width direction from a tip of an arm portion 160 of a flap 140 incline in a direction where the tips separate from the support column member 13 contrary to the first embodiment. Also, the support shaft inclines in such a way that a tip approaches the support face 11. A structure of the support shaft and a structure of the conical roller 18 are the same as that of the first embodiment so as to omit the explanation.

Even in a case wherein the flap is formed as mentioned above, the space saving of the support device itself can be made, and when the electronic apparatus is inserted, the conical roller can carry out the centering of the electronic apparatus at the proper position.

Incidentally, the embodiments described hereinabove have been explained only with a case of holding the portable electronic apparatus K; however, the present invention may be provided together with a charging function for the electronic apparatus as well. The present invention is not limited to the above-mentioned embodiments, and various design modifications can be possible based on the subject of the present invention.

The disclosure of Japanese Patent Application No. 2013-206121, filed on Oct. 1, 2013, is incorporated in the application.

While the invention has been explained with reference to the specific embodiments of the invention, the explanation is illustrative and the invention is limited only by the appended claims.

What is claimed is:

1. A support device for detachably supporting a portable electronic apparatus, comprising:
a base body having a support face;
a support column member provided to stand from one end of the base body;
a flap axially supported in the support column member turnably adapted to clamp the portable electronic apparatus between the flap and the support face;
conical rollers attached to the flap, each conical roller having an outer periphery diameter enlarged from one end portion thereof, and an urging device provided between the support column member and the flap, and urging the flap in a direction of approaching the support face, wherein the flap includes an arm portion, and support shafts extending in a right-and-left width direction from the arm portion, the support shafts incline relative to the support face, the support shafts incline downward from the arm portion toward right-and-left end portions, respectively, and each conical roller is turnably supported on the support shaft such that a small diameter portion of roller is located close to the arm portion.

2. A support device according to claim 1, wherein a turning shaft line of the conical roller inclines toward an insertion direction of the portable electronic apparatus.

3. A support device according to claim 1, wherein the support column member is provided on a back end side of the base body adapted to face an insertion direction of the portable electronic apparatus.

4. A support device according to claim 1, wherein a surface of the conical roller is formed by an elastic member.

\* \* \* \* \*